(12) United States Patent
Axmon et al.

(10) Patent No.: US 12,075,265 B2
(45) Date of Patent: Aug. 27, 2024

(54) DIRECTING DEVICES FOR COVERAGE MEASUREMENT PURPOSES

(71) Applicant: Telefonaktiebolaget LM Ericsson (publ), Stockholm (SE)

(72) Inventors: Joakim Axmon, Limhamn (SE); Esther Sienkiewicz, Ottawa (CA)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 43 days.

(21) Appl. No.: 17/056,864

(22) PCT Filed: Jun. 1, 2018

(86) PCT No.: PCT/EP2018/064530
§ 371 (c)(1),
(2) Date: Nov. 19, 2020

(87) PCT Pub. No.: WO2019/228653
PCT Pub. Date: Dec. 5, 2019

(65) Prior Publication Data
US 2021/0204147 A1  Jul. 1, 2021

(51) Int. Cl.
*H04W 24/02* (2009.01)
*H04L 41/0677* (2022.01)
(Continued)

(52) U.S. Cl.
CPC ......... *H04W 24/02* (2013.01); *H04L 41/0677* (2013.01); *H04W 16/18* (2013.01);
(Continued)

(58) Field of Classification Search
CPC ..... H04W 24/02; H04W 24/08; H04W 24/10; H04W 16/18; H04W 76/18; H04L 41/0677
See application file for complete search history.

(56) References Cited

U.S. PATENT DOCUMENTS 10,051,594 B1 * 8/2018 Ramamurthy ........ H04W 64/00
2011/0183661 A1 * 7/2011 Yi ..................... H04W 24/10
455/422.1
(Continued)

FOREIGN PATENT DOCUMENTS

JP   2003115009 A   4/2003
WO  2011101026 A1  8/2011

OTHER PUBLICATIONS

PCT International Search Report, mailed Oct. 10, 2018, in connection with International Application No. PCT/EP2018/064530, all pages.
(Continued)

*Primary Examiner* — Khaled M Kassim
*Assistant Examiner* — Hector Reyes
(74) *Attorney, Agent, or Firm* — Leffler Intellectual Property Law, PLLC (57) ABSTRACT

A method and apparatus for an incentive and measurement coordination function in a mobile communications network cooperating with a gaming server, advertisement server or similar node or function to attract smartphone users, or users of other devices, to geographical areas where there is a need for coverage measurements. In particular, user equipments may be directed or steered towards areas where network related measurements are necessary (e.g. RSRP) and which are relevant e.g. for network planning. In this manner, an operator may reduce the amount of, or completely eliminate, drive tests (minimization of drive tests, MDT). Users may get incentives (e.g. vouchers, prizes, etc.) in order to move to areas where such measurements are necessary.

21 Claims, 7 Drawing Sheets

Flow Diagram for IAMTF (51) Int. Cl.
*H04W 16/18* (2009.01)
*H04W 24/08* (2009.01)
*H04W 24/10* (2009.01)
*H04W 76/18* (2018.01)

(52) U.S. Cl.
CPC .......... *H04W 24/08* (2013.01); *H04W 24/10* (2013.01); *H04W 76/18* (2018.02)

(56) References Cited

U.S. PATENT DOCUMENTS

| | | | | |
|---|---|---|---|---|
| 2011/0201279 | A1* | 8/2011 | Suzuki | H04W 24/10 455/67.11 |
| 2012/0040760 | A1* | 2/2012 | Auterio | A63F 13/216 463/40 |
| 2012/0088457 | A1* | 4/2012 | Johansson | H04W 24/10 455/67.11 |
| 2013/0114446 | A1* | 5/2013 | Liu | H04W 24/10 370/252 |
| 2014/0043990 | A1* | 2/2014 | Lin | H04W 74/006 370/252 |
| 2015/0208197 | A1 | 7/2015 | Keskitalo et al. | |
| 2018/0014272 | A1* | 1/2018 | Inui | H04W 24/08 |

OTHER PUBLICATIONS

PCT Written Opinion, mailed Oct. 10, 2018, in connection with International Application No. PCT/EP2018/064530, all pages.

3GPP TS 32.422 V13.0.0, Jun. 2015, 3rd Generation Partnership Project; Technical Specification Group Services and System Aspects; Telecommunication management; Subscriber and equipment trace; Trace control and configuration management, Release 13, 151 pages.

3GPP TS 37.320 V13.1.0, Mar. 2016, 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2, Release 13, 26 pages.

3GPP TS 32.422 V11.10.0, Jun. 2014, 3rd Generation Partnership Project; Technical Specification Group Services and System Aspects; Telecommunication management; Subscriber and equipment trace; Trace control and configuration management, Release 11, 135 pages.

European Communication issued Mar. 29, 2023 in connection with European Application No. 18733186.3, 19 pages.

* cited by examiner

Figure 1: Mobile Communications Network

Figure 2: Cellular layout

Figure 3: Mobile Communications Network

Figure 4: Flow Diagram for IAMTF

Figure 5: information Contents

Figure 6: Hardware

Figure 7: Computer Program Product

DIRECTING DEVICES FOR COVERAGE MEASUREMENT PURPOSES

TECHNICAL FIELD

Embodiments presented herein relate to a method, an apparatus, a controller, a computer program, and a computer program product for a network management function in a mobile communications network cooperating with a gaming server, advertisement server or similar node or function to attract smartphone users, or users of other devices, to geographical areas where there is a need for coverage measurements.

BACKGROUND

Mobile communication networks (MC-NW) are normally multi-purpose networks providing communication capabilities for a variety of communication devices. These networks are typically being managed by an operator.

Some of the communication devices (CD), the mobile communication devices (MCD), connect wirelessly to the networks' wireless access nodes (AN). Mainly because they will move around geographically, but also for other reasons. The mobile communication devices connect either directly to the wireless access nodes or via different relay techniques like e.g. through mesh networks or ad-hoc networks.

Some other communication devices connect via landline, or shortrange radio links like for example Wi-Fi, to Internet which connects to the mobile communication networks via gateways.

Today many communication devices, such as for example smartphones, tablets and computers with a built in mobile telephone modem, can connect to the mobile communication networks both via the access points and via internet.

The mobile communication devices (MCD) are also known as wireless devices (WD), wireless terminals (WT), mobile terminals (MT), mobile stations (MS), user equipment (UE), user devices (UD) etc. These terms can typically be regarded as synonyms, but some of them may in some contexts denote a communication device in relation to a specific telecom standard, but the latter aspect is not of importance in this disclosure, thus in this disclosure all the terms above are considered as synonyms.

The mobile communication devices in the present context may be, for example, portable, pocket-storable, hand-held, computer-comprised or vehicle-mounted mobile devices.

Examples of mobile communication devices could be mobile telephones, cellular telephones, smartphones, laptops, tablet computers, electronic books etc.

The mobile communication devices are enabled to communicate wirelessly in a mobile communication network. The communication may be performed e.g. between two mobile communication devices, between a mobile communication device and a regular fixed telephone and/or between a mobile communication device and a computer or server. The mobile communication devices also communicate with the mobile communication network itself, among other to exchange system and control information.

A mobile communication network (MC-NW) is sometimes also referred to as a cellular communication network, a cellular radio system, a cellular network, a mobile telephony network or even a wireless communication network or a wireless communication system.

These terms can typically be regarded as synonyms, but sometimes the terms wireless communication network and wireless communication system can be seen as a wider term including communication systems that allows for wireless communication but does not necessarily have a traditional cellular structure, examples of such systems could be devices communicating with Bluetooth or Wi-Fi.

In this disclosure all the terms above are considered as synonyms,

A cellular communications network covers a geographical area which is divided into cell areas, wherein each cell area is being served by a wireless access node (AN). Put simply it can be said that a cell is the geographical area where radio coverage is provided by a wireless access node. In real life cells to some extent overlap geographically. Please note. in some standards a wireless access node, or just the term access node, refers to functionality or equipment that can cover/serve multiple cells. To make this disclosure more pedagogical and easier to follow, the embodiments herein use the example where a wireless access node covers/serves only one cell, but the description and claims covers also the case when an access node covers/serves multiple cells.

A cellular communications network normally comprises one or more Radio Access Networks (RAN) and one or more core networks (CN). The Radio Access Network comprises the wireless access nodes (AN).

The wireless access nodes could be either base stations, using communication protocols that are specifically standardised for a certain cellular communications network, or other types of wireless access nodes allowing the mobile communication devices to connect via alternative wireless technologies like Wi-Fi.

The base stations could be any of Radio Base Station (RBS), gNB, eNB, eNodeB, NodeB, B node, or BTS (Base Transceiver Station), depending on the technology and terminology used. The base stations may be of different classes such as e.g. macro eNodeB, home eNodeB or pico base station, based on transmission power and thereby also cell size.

Further, each wireless access node may support one or several communication technologies. The wireless access nodes communicate over the air interface operating on radio frequencies with the wireless devices within range of the wireless access node.

In the context of this disclosure, the expression Downlink (DL) is used for the transmission path from the wireless access node to the wireless device. The expression Uplink (UL) is used for the transmission path in the opposite direction i.e. from the wireless device to the wireless access node.

By nature, all communication links are unreliable to some extent. Examples could be that a wireline communication link can be physically cut of, and a wireless communication link can suddenly experience a higher amount of interference or the mobile communication device could run out of coverage or lose contact completely temporarily or permanently. The above scenarios typically result in degraded communication capabilities.

Wireline links are not expected to be unreliable unless in unusual conditions. Wireless links on the other hand are expected to provide communication capabilities that will vary under different conditions.

When introducing, expanding, or in some other way changing a mobile communication network the operator performs network planning and then implements the planned network by for example; adding and/or moving access nodes, adding and/or moving frequencies or other resources, etc. The process is iterative, when a network change is implemented it needs to be verified. If the results of the verification are not satisfactory a modified plan has to be made, which then needs to be verified, and so on.

Traditionally the verifications have been performed by drive testing, also referred to as drive tests.

Drive testing is a method of measuring and assessing the coverage, capacity and Quality of Service (QoS) of a mobile communication network.

The technique consists of using a vehicle containing measurement equipment that can detect and record a wide variety of parameters related to the service provided by a mobile communication network in a specific geographical area. By measuring what service a mobile communication device, and thus indirectly how a subscriber would experience the service in any specific area, an operator can make directed changes to a network that provide better coverage and service to their customers.

Drive testing requires a vehicle outfitted with drive testing measurement equipment. The equipment are usually highly specialized electronic devices that interface to OEM mobile handsets. This ensures measurements are realistic and comparable to actual user experiences. Drive tests are expensive and have traditionally constituted a significant part of the operating expenditure. MDT (minimization of drive tests) was introduced in 3GPP EUTRAN Rel.10 as a means for operators to reduce drive tests for verifying that a network configuration provides the desirable coverage. At the time of introduction of MDT, a big mobile telecommunications operator expected that MDT and other SON (self-organizing network) functions, to which MDT belongs, would reduce the expenditure on drive testing by about 40%.

Besides the purely economic aspect there has also been an environmental concern; by reducing the drive tests the operator can reduce its $CO_2$ footprint.

The core feature of MDT is that a UE (user equipment) which is in idle mode (e.g. RRC_IDLE) logs information which it acquires from normal idle mode operation, and then at some point in time transmits the log to a network node. MDT is also supported in connected mode (e.g. RRC_CONNECTED) but with lesser requirements on logging since most of the information can be sent to the network node via regular measurement reporting.

The first release of MDT focused on mobility measurements, i.e. RSRP (reference signal received power) and RSRQ (reference signal received quality), of the serving cell. Various ways of providing location information for the UE exists. Neighbour cell measurements can be included to allow the operator to pinpoint the location at which the logged measurements were done. Location information can also be provided via logged GNSS (global navigation satellite system) coordinates. Each logged measurement is also time-stamped.

In later releases of MDT the logged information has been extended to for instance include information about radio link failures (RLF; Rel.12) experienced by the UE.

Core Network and Radio Access Network aspects of MDT are provided in 3GPP TS 32.422 and 3GPP TS 37.320, respectively. In order to facilitate the understanding of MDT as of today the basics, that applies to this disclosure, of TS 32.422, V 11.1.0, section 4.1.1.6a is presented below in a simplified rewritten form, with some comments added.

Two types or modes of MDT are available.
Immediate MDT, which is used with UEs that are in connected mode. Immediate mode is more straight forward, please compare with Logged MDT, described below.
Logged MDT, which is used with UEs that are in idle mode. Logged MDT is slightly more complex, among other things since the configuration of the Logged MDT has to be made when the UE is in connected mode. You also can not know exactly in which cell the UE is positioned, you basically only know which tracking area (group of cells) it is associated with.

In order to make use of MDT:
A management function/node sends a Trace Session Activation Request to an eNB. The Trace Session Activation Request, which among other things contains a variety of parameters, for configuring EU measurements and reporting, comprises:
An Area (a list of EUTRAN Cells)
Reporting and Event Thresholds
How and when to measure.
How and when to report.
The eNB starts a Trace Session
The eNB selects one or more UEs for MDT. A UE are selected on criteria comprising:
The Area received from the management function/node.
The position/area of the UE
User Consent Information for the UE, which the UE has reported earlier. The User Consent Information, states among other things whether the UE allows MDT.
If the eNB intends to select Logged MDT, it shall also take into account:
UE Capability, which states whether the UE supports Logged MDT.
The eNB activates the MDT functionality in the selected UEs, by sending configuration information to the UE. This is done in one of two ways, to a specific UE, depending on whether Immediate MDT or Logged MDT is chosen.
If the UE is in connected mode, Immediate MDT is selected, and the configuration information is sent immediately.
If the UE is in idle mode, Logged MDT is selected. For UEs currently being in idle mode and camping in the cell served by the eNB the logged MDT configuration cannot be sent. These UEs may be configured when they initiate some activity (e.g., Service Request or Tracking Area Update) at next time.
The UE starts MDT functionality based on the received configuration parameters.
Note: The referred document also describes details on how the reporting is done, both in the UE depending on if Immediate MDT or Logged MDT is selected, and in the different nodes in the network. One thing that should be mentioned here is that the OAM server receives MDT reports and updates the coverage information. In case the OAM server has received sufficient information, it may identify other areas where coverage measurements are of interest. Otherwise the request on RAN to provide MDT reports remain. These parts are not discussed in more detail further in this disclosure.

SUMMARY

As of today, an operator who utilizes Minimization of Drive Tests (MDT) and enhanced versions thereof has no means for steering mobile communication devices towards areas that might be of high interest for network related measurements. Network related measurements here means measurements related to coverage, capacity, QoS and/or other related measurements that are relevant when verifying network planning. As a result, there may still be areas where traditional drive tests still need to be performed.

An object of embodiments herein is to allow an operator to reduce the amount of, or completely eliminate, drive tests.

The fundamental idea described herein is to create incentives for users to roam to areas where network related measurements are needed. In other words, to allow an operator to directly or indirectly steer, direct, encourage or motivate users to visit a geographical area that is of particular interest from coverage and network configuration point of view. Network related measurements are then activated in the geographical area.

The various embodiments herein could be summarized as:

A method, being performed by an incentive and measurement trigger function, for directing a mobile communications device towards a geographical area with the purpose of utilizing the mobile communication device, when in the geographical area, for making network related measurements, the method comprising;
  obtaining area information indicating the geographical area for which it would be beneficial to make network related measurements; and
  providing directing information indicating the geographical area to an incentive distribution function; and
  initiating network related measurements in the geographical area.

Wherein in some embodiments the area information comprises at least one of, a place name or geographical coordinates related to the geographical area.

Wherein in some embodiments the area information comprises one or more identities of one or more wireless access nodes.

Wherein in some embodiments the area information comprises one or more identities of one or more groups of wireless access nodes.

Wherein in some embodiments the area information comprises timing information.

Wherein in some embodiments the directing information comprises; at least one of, a place name or geographical coordinates, related to the geographical area.

Wherein in some embodiments the directing information, comprises timing information.

Wherein in some embodiments, initiating network related measurements in the geographical area, further comprises;
  requesting an intermediate node to, request a wireless access node to start a network related measurement session and to activate the mobile part of the network related measurement in a mobile communication device in the geographical area.

Wherein in some embodiments, initiating network related measurements in the geographical area, further comprises;
  requesting a wireless access node to start a network related measurement session and to activate the mobile part of the network related measurement in a mobile communication device in the geographical area.

Wherein, in some embodiments initiating network related measurements in the geographical area, further comprises at least initiating measurements of one of;
  serving cell and neighbor cell reference signal received power, serving cell and neighbor cell reference signal received quality, serving cell and neighbor cell reference signal, signal to interference and noise ratio and radio link quality comprising at least one of radio link failure and RRC reestablishment failure.

An apparatus executing an incentive and measurement trigger function, for directing a mobile communications device towards a geographical area with the purpose of utilizing the mobile communication device, when in the geographical area, for making network related measurements, comprising;
  an obtaining unit being configured to obtain area information indicating the geographical area for which it would be beneficial to make network related measurements; and
  a providing unit configured to provide directing information indicating the geographical area to an incentive distribution function; and
  an initiating unit configured to initiate network related measurements in the geographical area.

Wherein in some embodiments, the area information, comprises at least one of, a place name or geographical coordinates related to the geographical area.

Wherein in some embodiments, the area information, comprises one or more identities of one or more wireless access nodes.

Wherein in some embodiments the area information, comprises one or more identities of one or more groups of wireless access nodes.

Wherein in some embodiments the area information, comprises timing information.

Wherein in some embodiments the directing information, comprises; at least one of, a place name or geographical coordinates, related to the geographical area.

Wherein in some embodiments the directing information, comprises timing information.

Wherein in some embodiments, initiating network related measurements in the geographical area, further comprises;
  requesting an intermediate node to, request a wireless access node to start a network related measurement session and to activate the mobile part of the network related measurement in a mobile communication device in the geographical area.

Wherein in some embodiments, initiating network related measurements in the geographical area, further comprises;
  requesting a wireless access node to start a network related measurement session and to activate the mobile part of the network related measurement in a mobile communication device in the geographical area.

Wherein in some embodiments, initiating network related measurements in the geographical area, comprises at least initiating measurements of one of;
  serving cell and neighbor cell reference signal received power, serving cell and neighbor cell reference signal received quality, serving cell and neighbor cell reference signal, signal to interference and noise ratio and radio link quality comprising at least one of radio link failure and RRC reestablishment failure.

A computer program, which when run, causes a node or server to execute any of the embodiments of the methods herein.

A computer program product comprising a computer program as described above and a computer readable storage medium on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying figures, in which.

DETAILED DESCRIPTION

The inventive concept will now be described more fully hereinafter with reference to the accompanying figures, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
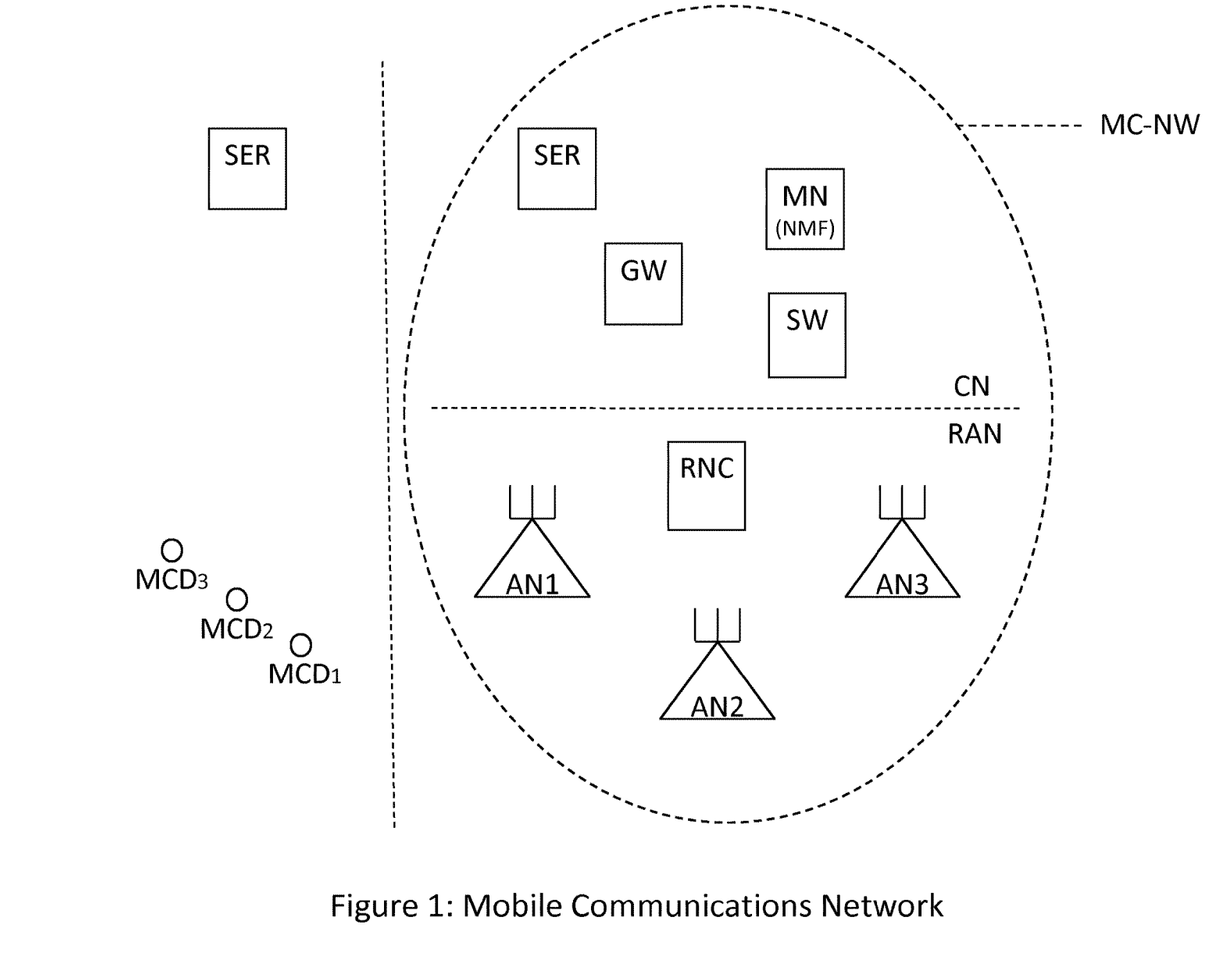
FIG. 1 depicts a state of the art mobile telecommunication network and surrounding equipment.

FIG. 1 depicts a mobile communications network, MC-NW, and surrounding equipment. The figure does not reflect any specific standard, it rather points out different pieces of equipment in a generic mobile communication network. The person skilled in the art would understand to adapt the figure and the different pieces of equipment to different standards.

The mobile communications network, MC-NW, comprises one or more radio access networks, RAN, and one or more core networks, CN.

The radio access network comprises wireless access nodes, AN1, AN2, An3, etc. In some technologies, let's take UMTS as an example, the functionality of a traditional access node can be said to be divided between two pieces of equipment, an access node, referred to as Node B, and a governing element/node, referred to as a radio network controller, RNC. Here typically the radio network controller can control multiple access nodes. This division is reflected in FIG. 1.

The core network handles functions like aggregation, authentication, call control/switching, charging, service invocation, gateway functionality, operation and maintenance functionality, and subscriber data base. This functionality can physically be implemented in one or more different nodes, depending on technology and implementation. In FIG. 1. The core network is illustrated with a switch, SW, a gateway, GW and a management node, MN. The call control/switching functionality would typically reside in one or more switches, the gateway functionality in one or more gateways and the network management functionality, NMF, in one or more management nodes. The exact distribution of the functionality between the nodes varies between different systems and different standards and different configurations.

The mobile communications network can also comprise servers, SER, that interact with the mobile communication devices on an application level. The servers that comprised by the mobile communications network would be run/administered by the operator of the mobile communications network.

The mobile communication devices, MCD1, MCD2, MCD3, etc., can be considered to be both part of the mobile communications network (MC-NW) and outside the mobile communications network. In this disclosure the mobile communication devices are considered to be outside the mobile communications network.

Servers, SER, communicating with the mobile communication devices on an application level, can also reside outside the mobile communication network. The servers can be connected in various ways to the mobile communications network, allowing them to communicate with the mobile communication devices as well as nodes in the core network. Servers that resides outside the mobile communications network could be run/administered by either the operator of the mobile communications network, or by another entity or company.

The current development of some standards suggests that functionality from various equipment in both the RAN and the CN can reside in the Cloud, this applies also to the network management function. Server functionality can also reside in the Cloud.

Cloud computing is an information technology paradigm that enables access to shared pools of configurable system resources and higher-level services that can be provisioned with minimal management effort, often over the Internet. Cloud computing relies on sharing of resources. Third-party clouds enable organizations to focus on their core businesses instead of expending resources on computer infrastructure and maintenance.

Figure 2:
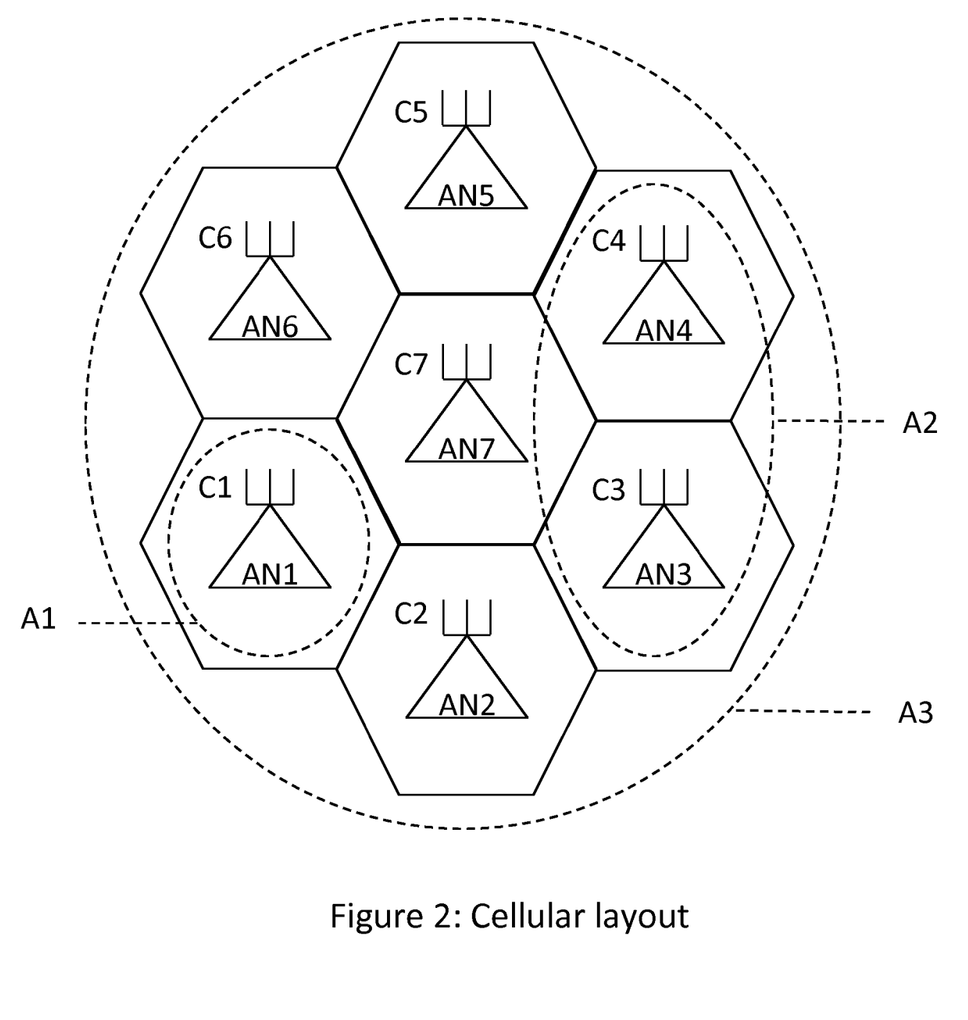
FIG. 2 depicts the cellular layout of a mobile telecommunication network, is also shows geographical areas which could benefit from network related measurements overlaid on the cellular layout.

FIG. 2 depicts the cellular layout of a mobile communication system. This cell shows a basic cellular structure comprising a number of cells, C1 to C7, each cell is served by one access node, AN1 to AN7. This figure does not reflect any specific standard, it rather points out the generic idea. Some standards can, more or less directly, be represented by the figure. Some other standards have a more complex layout, with cells of significantly different sizes, access nodes utilising beamforming, etc. The person skilled in the art would understand how to adapt the figure to match various standards and scenarios.

This figure also illustrates how various areas could relate to cells and access nodes. The areas of interest could cover one single wireless access node or several wireless access nodes, which is shown in the picture.

Area A1 exemplifies an area covered by one cell, C1, served by one access node, AN1.

Area A2 exemplifies an area covered by two cells, C3 and C4, each served by one access node, AN3 and AN4.

Area A3 exemplifies an area covered by 7 cells, C1 to C7, each served by one access node, AN1 to AN7.

Examples for all of the above could be an area along a road, indoor coverage in a shopping centre, coverage in the city centre or in a park or in a remote area. The need for network related measurements could be caused by that a new wireless access node has been installed to solve some network coverage issues, changes in network planning in one or more wireless access nodes, a complete new installation of one or more wireless access nodes in an area that did not previously had coverage.

A (single capital letter A) denotes any geographical area that would benefit from network related measurements. C (single capital letter C) denotes any cell that would benefit from network related measurements.

Figure 3:
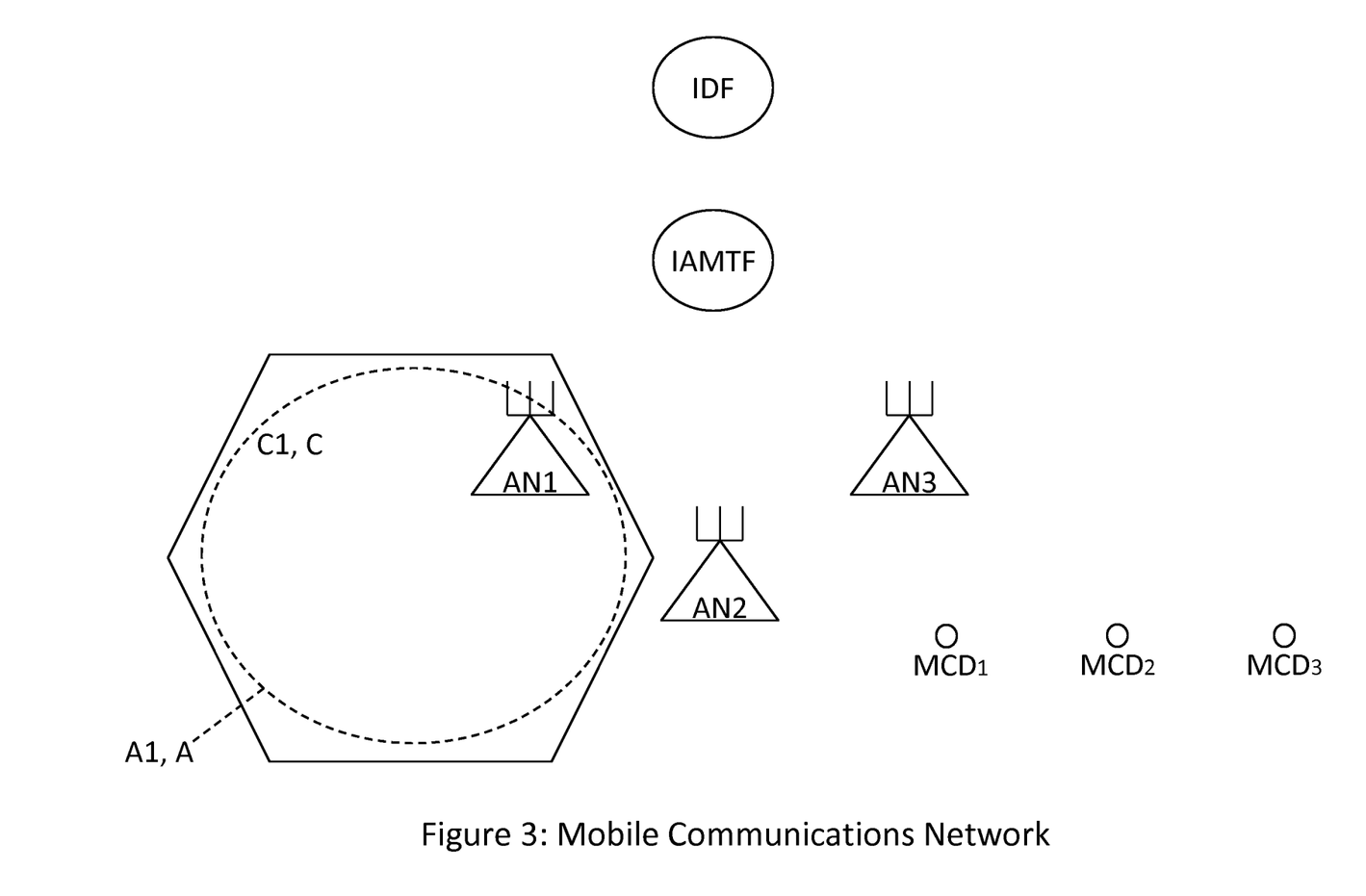
FIG. 3 shows the main functions and entities involved in various embodiments described herein.

FIG. 3 shows the main functions and entities involved in various embodiments described herein.

In current LTE Networks, as described in the background section in slightly different words, the Operation and Management (OAM) server, or any other Network Management (NM) server, containing coverage and capacity optimization (CCO) Self Optimizing Network (SON) functionality, analyses and determines, based on existing coverage information, where network related measurements are needed.

The cause might be that there is insufficient information on the coverage in some geographical areas or on the coverage in some geographical areas at certain times of day or certain days, e.g. weekdays/weekend. It could also be that network reconfiguration, tuning and optimization render the need for validation of the coverage, or that a high concentration of radio link failures is experienced.

Thus, the OAM server determines in which geographical areas the coverage is to be validated by means of network related measurement, using MDT, and as described in the background section, it request the RAN to provide MDT reports. The RAN via eNB in turn configures the mobile communication devices, referred to as user equipment (UE) in LTE, in the concerned geographical area to provide MDT reporting. The UE provides MDT report(s) to OAM via RAN. In case of immediate MDT (MDT in connected mode) multiple reports sent to the RAN, within a certain time period. In case of logged MDT (MDT in idle mode) one report is sent to RAN by the UE, within a certain time period.

The fundamental idea in the current disclosure herein is to create incentives for users to roam to an area where network related measurements are needed, and to start network related measurements in that geographical area.

So how could the operator of the mobile communication network provide incentives to the mobile communication devices, or users thereof? One way is to make it indirectly, the operator could have some sort of deal (economic or other) with a third party, the operator would inform the third party about geographical areas where he would like to see more mobiles. The third party would then, through an incentive distribution function provide incentives to the mobile communication devices, or users thereof. The operator could also provide the incentivise by itself, by using an incentive distribution function which is under the operator's control. The incentive distribution function is a concept introduced in this disclosure.

So how can incentives for users to move to a certain area look like? It would have to be something that would be appealing to the user.

It could be related to something like purchasing things in real life, e.g. like information on discounts in stores. Or that you could access discount vouchers in an area that is not directly in the stores vicinity, these vouchers could then be redeemed in the store later.

It could be some sort of competition; if you visit a certain number of areas within a certain amount of time and possibly actively contact a server, or just enter connected state in the mobile communications network, to verify you have visited the particular areas, you will get some sort of price or reward later.

It could be related to something that would give you a benefit in an app, like for example a game, installed on a smartphone. The incentive distribution function could for example arrange for virtual things to be put out in one, or more, geographical area. The users will then find out about it indirectly, from apps running in the mobile or from other users, from home pages on internet, etc.

One strong trend in many industries is gamification, i.e., using game design and principles in non-game contexts to improve the user engagement.

Augmented Reality together with an incentive, such as in Pokémon GO, has proven to be a powerful tool and today one can see people gathering at previously abandoned places, hoping to catch some Pokémons at a Pokéstop, or train already captured Pokémons at a Pokémon Gym. The PokéStops, the Pokémon gyms and the Pokémons themselves of course only exist in the location-based augmented reality in the user's smart phone.

In one embodiment augmented reality is combined with network related measurements, in order to steer users to areas where network related measurements are needed, and to make use of the measurement results. An operator or a third party may provide a gaming application with some incentive (pleasure of playing, collect rewards that can be exchanged for increased data limit, etc). The operator may control where there are attractive areas for the users of the gaming application, e.g. where rewards can be collected, or interesting situations arise in the game. A user that roams an area where it is highly desirable to acquire coverage information may get a larger incentive (e.g. larger discount) than users in other locations.

In some embodiments the incentive may be discounts or "coupons", in other embodiments it might be modifications of the subscription's price plan, e.g. increased number of free SMSs, increased number of free minutes for voice, or increased data traffic limit. In yet other embodiments it might be that users collect points to get ranked, and highly ranked users may get access to scarce products or early launches of products. The exact architecture with respect to interactions between the network and the server providing incentives depends on the embodiment.

To avoid that Global Positioning (GPS) spoofing is being used, i.e. where the user is in one location but the application running in the mobile communication device presents another location by manipulation of GPS coordinates, an action that forces the mobile communication device, if in idle mode, to do a random access may be considered, e.g. to connect to the mobile communication network to claim the reward or voucher. The network can then verify the coarse location of the mobile communication device and cross-check it with the network related measurement reports to verify that the mobile communication device has been in the area for which it is reporting the network measurement reports.

Let's in this disclosure introduce the concept of an Incentive and Measurement Trigger Function, IAMTF. The purpose of this function is to obtain area information indicating the geographical area, A, for which it would be beneficial to make network related measurements, and to provide directing information indicating the geographical area, A, or areas, to an incentive distribution function, IDF, and to initiate network related measurements in the geographical area.

The Incentive and Measurement Trigger Function could reside in the mobile communications network, preferably in a node or server in the core network, but it could also reside outside the mobile communication network, either in a specific server or in the cloud.

The Incentive and Measurement Trigger Function could obtain the area information in various ways, non-limiting examples are listed below:

The area information could be entered via a user interface.

The area information could be spontaneously received from another node.

The area information could be requested and received from another node.

The Incentive and Measurement Trigger Function could provide the directing information to a variety of different receiving entities. The provision can also be done in different ways.

The incentive distribution function, IDF, the concept of which is also introduced in this disclosure, receives directing information from the Incentive and Measurement Trigger Function, and then provides initiatives to, one or more, mobile communication devices, MCD1, MCD2, MCD3, etc, or users thereof. The users and their devices will then, if the incentive suits them, move to the geographical area, A, covered by the cell C.

The incentive distribution function makes a geographical area attractive for mobile communication devices or users thereof. It could be by focusing interesting elements of a game to the geographical area. Using Pokémon GO as example it might be a Pokéstop or a Pokémon gym. In other applications it may be collectable rewards, etc. By making those areas interesting, players/smartphone users will roam the geographical area and thus the concentration of mobile communication devices that can aid in network related measurements will increase.

The incentive distribution function could provide incentives to mobile communication devices or users thereof in a variety of ways.

Broadcasting or unicasting messages like
SMS, MMS and similar
In app messages, like for example messages in a game.
Broadcasting, transmitting or posting messages or videos or sounds in medias comprising:
Websites
TV
Radio
Newspapers, other magazines or Commercial leaflets In one embodiment, the incentive distribution function could be a function executing in the same node as the Incentive and Measurement Trigger Function. It could in fact be the same function responsible for both tasks, acting as Incentive and Measurement Trigger Function and incentive distribution function. This could be suitable if the operator of the mobile communications network also provides services or applications which interacts with end-users.

In one embodiment the incentive distribution function could be a function executing on a server outside the mobile communication network in the cloud. This server could be under control of the operator of the mobile communication network, or it could be under control of a different company or operator. It could e.g. be a game server or an advertisement server.

The timing of when to make the measurements are important. The incentive and measurement trigger function can decide on, or obtain information on, when and for how long the network related measurements should take place.

This information can be provided in the directing information to the incentive distribution function. It can be provided in various forms:
Start time and duration
Start time and stop time The incentive distribution function would also have to consider the timing, in order to allow for the mobile communications network to obtain the best network measurement results.

Concerning timing the incentive and measurement trigger function could initiate the network related measurement in different ways:
Wait until the start time and then initiate the network related measurements. In this case either:
Providing the duration when initiating the network related measurements.
Stop the network related measurements when appropriate.
Send the timing information beforehand and let the node, or nodes, responsible for the network related measurements to arrange for the timing.

The incentive and measurement trigger function would initiate the network related measurements by either of;
requesting an intermediate node to, request a wireless access node (AN) to start a network related measurement session and to activate the mobile part of the network related measurement in a mobile communication device (MCD) in the geographical area.
requesting a wireless access node (AN) to start a network related measurement session and to activate the mobile part of the network related measurement in a mobile communication device (MCD) in the geographical area.

Non-limiting examples of network related measurements in the geographical area, comprises at least one of, serving cell and neighbor cell reference signal received power (RSRP), serving cell and neighbor cell reference signal received quality (RSRQ), serving cell and neighbor cell reference signal, signal to interference and noise ratio (RS-SINR) and radio link quality comprising at least one of radio link failure (RLF) and RRC_reestablishment failure.

In Immediate MDT, the measurements may further include measurements such as serving cell channel state information (CSI), comprising for instance: rank indication (RI), precoding matrix index (PMI) and channel quality index (CQI).

In both Immediate and Logged MDT in the $5^{th}$ generation of mobile communication systems, a.k.a. 5G or New Radio Access Technology (NR), measurements may further comprise determining so called synchronization signal block index (SSB index) or transmission beam index.

Figure 4:
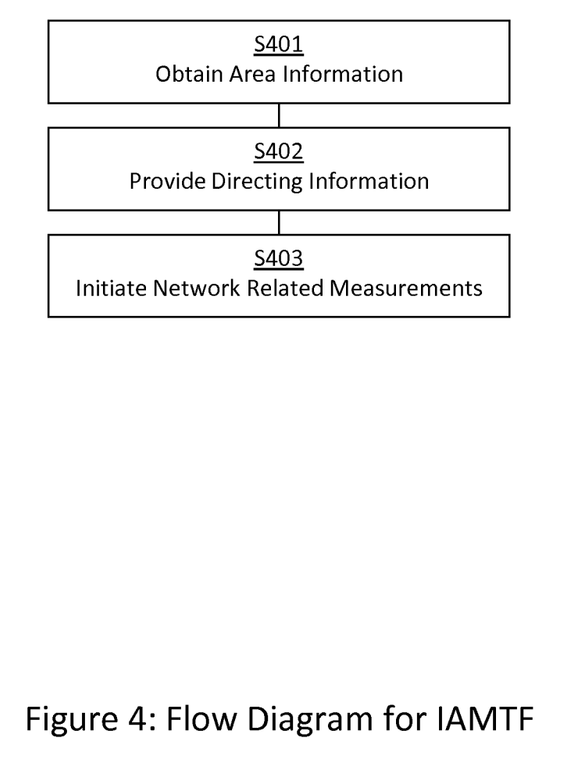
FIG. 4 is a flowchart is a flowchart depicting embodiments of a method in a Incentive and Measurement Trigger Function.

FIG. 4 is a flowchart is a flowchart depicting embodiments of a method in the Incentive and Measurement Trigger Function.

Steps:
S401, the incentive and measurement trigger function obtains area information.
S402, the incentive and measurement trigger function provides directing information to the incentive distribution function.
S403, the incentive and measurement trigger function initiates network related measurements.

The flowchart illustrates the scenario where the operator would like to see more mobile devices in the geographical area A1, covered approximately by cell C1, served by wireless access node AN1, as described in the previous chapter.

The incentive and measurement trigger function, IAMTF, would obtain, S401, area information, 5100, and use the geographical information, 5110, in order to know which area is of interest (in this case A1). It could optionally get timing information, 5120, in order to find out when the network related measurements should to be made.

The incentive and measurement trigger function, IAMTF, then provides, S402, directing information, 5200, to the incentive distribution function, IDF. The geographical information, 5210, indicates the geographical area of interest (in this case A1), the optional timing information, 5220, indicates when the network related measurements should be made, meaning when the mobile communication devices should be in the area.

The incentive and measurement trigger function, IAMTF, then initiates, S403, the network related measurements.

Figure 5:
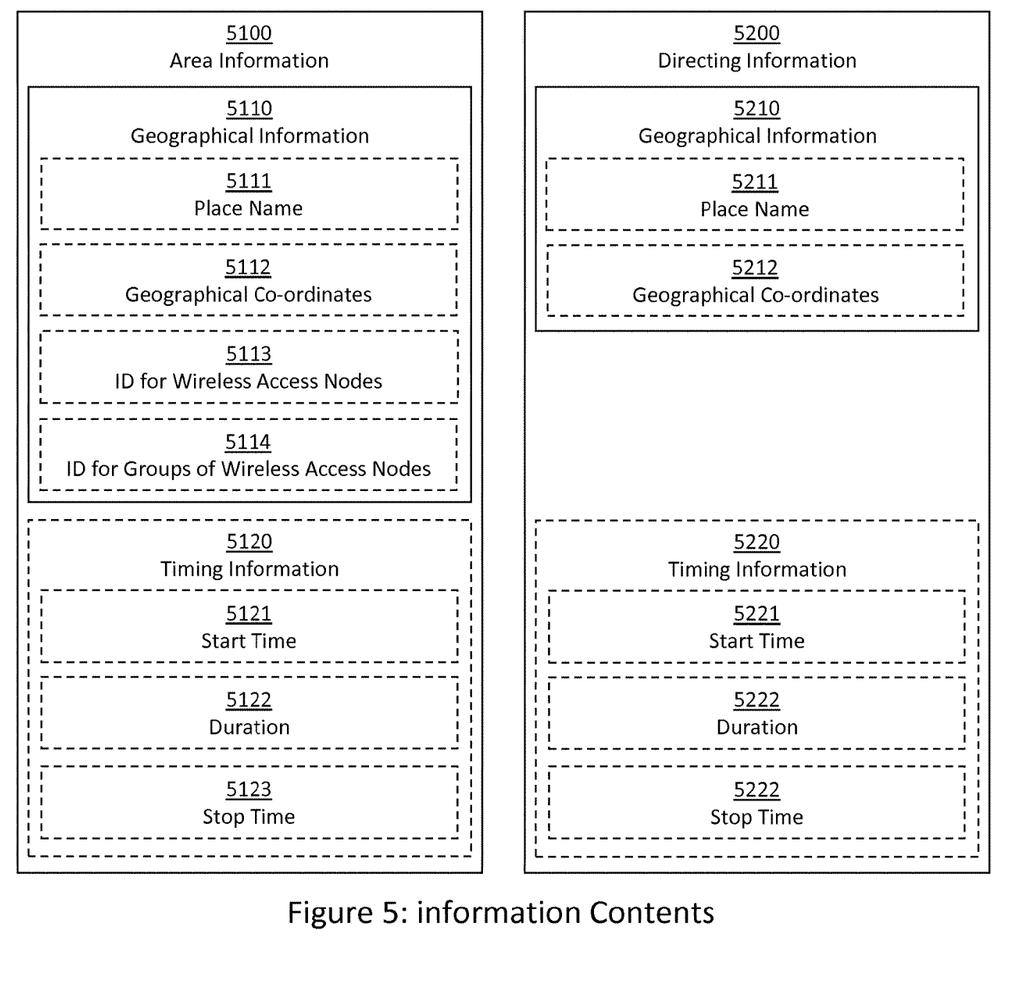
FIG. 5 shows the layout of the area information and the directing information.

FIG. 5 shows the layout of the area information and the directing information.

The area information, 5100, comprises:
Geographical information, 5110.
Timing information, 5120, which is optional The geographical information, 5110, can comprise different information in different embodiments. The different information can be said to be optional, but at least one of the different information has to be present.

In one embodiment the geographical information comprises:
One or more place names, 5111.
In one embodiment the geographical information comprises:
One or more geographical coordinates, 5112.
In one embodiment the geographical information comprises:
One or more identities, of one or more wireless access nodes, 5113. The identities could either be numbers or logical or physical names for the wireless access nodes.
In one embodiment the geographical information comprises:
One or mode identities for one or more groups of one or more Wireless Access Nodes, 5114. The identities could either be numbers or logical or physical names for the groups. The groups could be tracking areas or other groups of wireless access nodes.

The timing information, 5120, can comprise different information in different embodiments.

In one embodiment the geographical information comprises:
A start time, 5121.
In one embodiment the geographical information comprises:
A duration, 5122.
In one embodiment the geographical information comprises:
A stop time, 5123.
In one embodiment the geographical information comprises:
A start time, 5121, and a duration, 5122.
In one embodiment the geographical information comprises:
A start time, 5121, and a stop time, 5123.

The directing information, 5200, comprises:
Geographical information, 5210.
Timing information, 5220, which is optional The geographical information, 5210, can comprise different information in different embodiments. The different information can be said to be optional, but at least one of the different pieces of information has to be present. The geographical information, 5210, is related to the geographical information, 5110, but the different information does not have to be identical, when it comes to format or contents, even though their names are similar.

In one embodiment the geographical information comprises:
One or more place names, 5211.
In one embodiment the geographical information comprises:
One or more geographical coordinates, 5212.

The timing information, 5220, can comprise different information in different embodiments. The timing information, 5220, is related to the timing information, 5120, but the different information does not have to be identical, when it comes to format or contents, even though their names are similar.

In one embodiment the geographical information comprises:
A start time, 5221.
In one embodiment the geographical information comprises:
A duration, 5222.
In one embodiment the geographical information comprises:
A stop time, 5223.
In one embodiment the geographical information comprises:
A start time, 5221, and a duration, 5222.
In one embodiment the geographical information comprises:
A start time, 5221, and a stop time, 5223.

Figure 6:
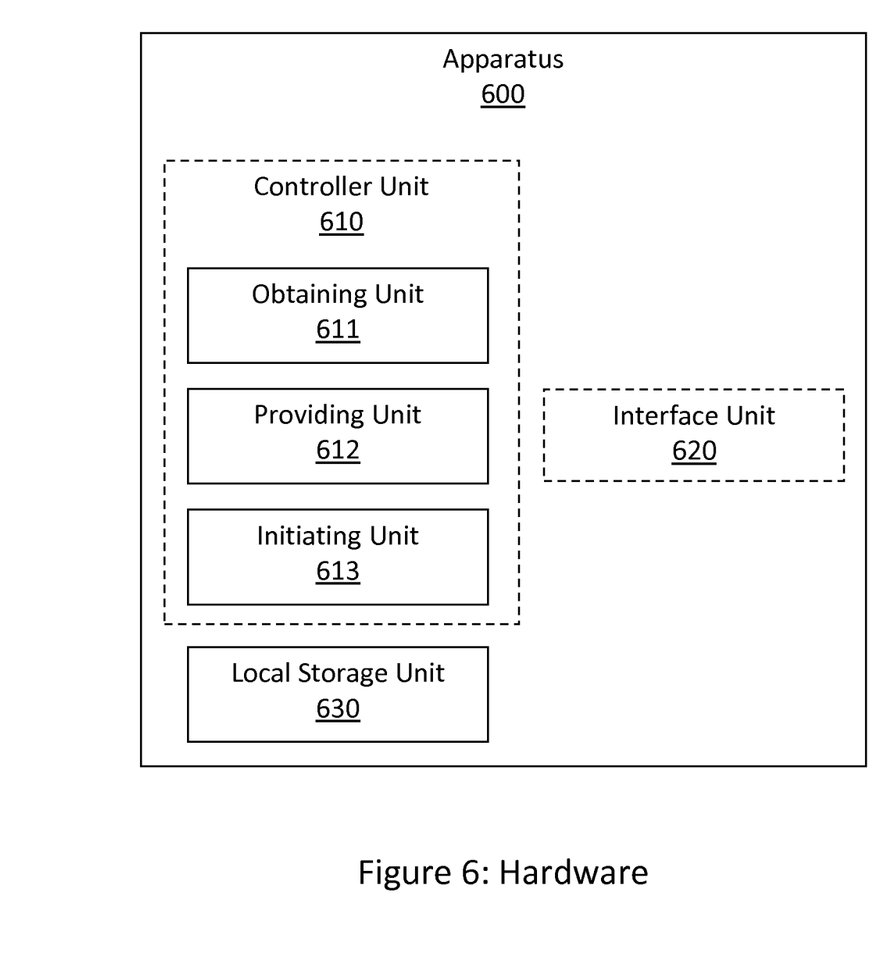
FIG. 6 is a schematic block diagram illustrating embodiments of a node implementing the Incentive and Measurement Trigger Function.

FIG. 6 is a schematic block diagram illustrating embodiments of an apparatus implementing the Incentive and Measurement Trigger Function.

The apparatus implements the Incentive and Measurement Trigger Function, IAMTF, and comprises various units. The apparatus could be a node, or server, or other hardware in the mobile communications network, a server or other hardware outside the mobile communications network and it could also be a server or other hardware in the cloud.

In one embodiment the apparatus, 600, comprises:
A controller Unit, 610, further comprising:
An obtaining unit, 611, configured to obtain area information, 5100.
A providing unit, 612, configured to provide directing information, 5200, to an incentive distribution function, IDF.
An initiating unit, 613, configured to initiate network related measurements.
An optional interface unit, 620, configured to, transmit and/or receive the various information according to the various embodiments described in this application.
A local storage unit, 630, configured to permanently or temporarily store different information according to the various embodiments described in this disclosure.

In one embodiment the apparatus, 600, comprises:
A controller Unit, 610, configured to:
a obtain area information, 5100.
provide directing information, 5200, to an incentive distribution function, IDF.
initiate network related measurements.
An optional interface unit, 620, configured to, transmit and receive the various information according to the various embodiments described in this application.
A local storage unit, 630, configured to permanently or temporarily store different information according to the various embodiments described in this disclosure.

In one embodiment the apparatus, 600, comprises:

An obtaining unit, 611, configured to obtain area information, 5100.

A providing unit, 612, configured to provide directing information, 5200, to an incentive distribution function, IDF.

An initiating unit, 613, configured to initiate network related measurements.

An optional interface unit, 620, configured to, transmit and receive the various information according to the various embodiments described in this application.

A local storage unit, 630, configured to permanently or temporarily store different information according to the various embodiments described in this disclosure.

The embodiments herein may be implemented through combination of analog and digital circuits, and one or more controller units, together with computer program code for performing the functions and actions of the embodiments herein.

Those skilled in the art will also appreciate that the blocks in the block diagram, may refer to a combination of analog and digital circuits, and/or one or more controller units, configured with software and/or firmware, e.g. stored in one or more local storage units, that when executed by the one or more controller units perform as described above. One or more of these controller units, as well as any other combination of analog and digital circuits, may be included in a single application-specific integrated circuitry (ASIC), or several controller units and various digital hardware may be distributed among several separate components, whether individually packaged or assembled into a system-on-a-chip (SoC). The one or more controller units may be any one of, or a combination of a central processing unit (CPU), graphical processing unit (GPU), programmable logic array (PAL) or any other similar type of circuit or logical arrangement.

Figure 7:
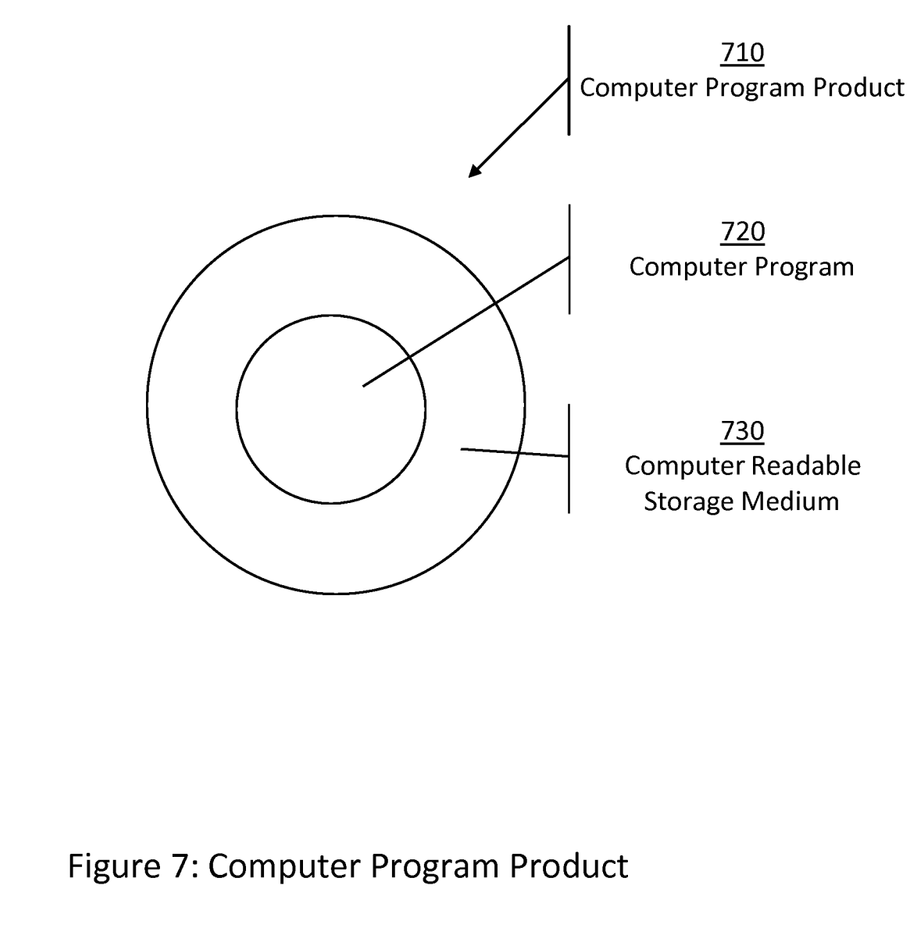
FIG. 7 shows one example of a computer program product comprising computer readable storage medium according to an embodiment.

FIG. 7 shows one example of a computer program product.

The computer program product (710) comprising a computer program (720), and a computer readable storage medium (730) on which the computer program is stored, where the computer program when run on the relaying device causes the relaying device to execute any or all of the various embodiments herein.

The program code mentioned above may also be provided as a computer program product, for instance in the form of a data carrier carrying computer program code for performing the embodiments herein when being loaded into the hardware. One such carrier may be in the form of a CD ROM disc. It is however feasible with other data carriers such as a memory stick. The computer program code may furthermore be provided as pure program code on a server and downloaded to the hardware device at production, and/or during software updates.

The inventive concept in this disclosure has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method, being performed by an incentive and measurement trigger function (IAMTF), for directing a mobile communications device towards a geographical area with the purpose of utilizing the mobile communication device, when in the geographical area, for making network related measurements, the method comprising:

obtaining area information indicating the geographical area for which it would be beneficial to make network related measurements; and providing directing information indicating the geographical area to an incentive distribution function (IDF) that distributes, to one or more mobile communications devices not currently served by a cell in the geographical area, an incentive to roam into the geographical area; and initiating network related measurements in the geographical area, wherein at least one of the one or more mobile communications devices is a reporting mobile communications device that received the incentive to roam into the geographical area and then reported network related measurements while in idle mode, and wherein the method further comprises:

verifying an actual presence of the reporting mobile communications device in the geographical area by distributing the incentive to the reporting mobile communications device only after the reporting mobile communications device connects to the cell in the geographical area.

2. The method according to claim 1, wherein the area information, comprises at least one of, a place name or geographical coordinates related to the geographical area.

3. The method according to claim 1, wherein the area information, comprises one or more identities of one or more wireless access nodes.

4. The method according to claim 1, wherein the area information, comprises one or more identities of one or more groups of wireless access nodes.

5. The method according to claim 1, wherein the area information, comprises timing information.

6. The method according to claim 1, wherein the directing information, comprises; at least one of, a place name or geographical coordinates, related to the geographical area.

7. The method according to claim 1, wherein the directing information, comprises timing information.

8. The method according to claim 1, wherein, initiating network related measurements in the geographical area, further comprises:

requesting an intermediate node to, request a wireless access node to start a network related measurement session and to activate the mobile part of the network related measurement in a mobile communication device in the geographical area.

9. The method according to claim 1, wherein, initiating network related measurements in the geographical area, further comprises:

requesting a wireless access node to start a network related measurement session and to activate the mobile part of the network related measurement in a mobile communication device (MCD) in the geographical area.

10. The method according to claim 1, wherein, initiating network related measurements in the geographical area, further comprises at least initiating measurements of one of:

serving cell and neighbor cell reference signal received power, serving cell and neighbor cell reference signal received quality, serving cell and neighbor cell reference signal, signal to interference and noise ratio and radio link quality comprising at least one of radio link failure and RRC reestablishment failure.

11. An apparatus executing an incentive and measurement trigger function (IAMTF), for directing a mobile communications device towards a geographical area with the purpose of utilizing the mobile communication device, when in the geographical area, for making network related measurements, comprising:

a controller, wherein the controller is configured to cause the apparatus to:
obtain area information indicating the geographical area for which it would be beneficial to make network related measurements; and
provide directing information indicating the geographical area to an incentive distribution function (IDF) that distributes, to one or more mobile communications devices not currently served by a cell in the geographical area, an incentive to roam into the geographical area; and
initiate network related measurements in the geographical area,
wherein at least one of the one or more mobile communications devices is a reporting mobile communications device that received the incentive to roam into the geographical area and then reported network related measurements while in idle mode,
and wherein the controller is further configured to cause the apparatus to:
verify an actual presence of the reporting mobile communications device in the geographical area by distributing the incentive to the reporting mobile communications device only after the reporting mobile communications device connects to the cell in the geographical area.

12. The apparatus according to claim 11, wherein the area information, comprises at least one of, a place name or geographical coordinates related to the geographical area.

13. The apparatus according to claim 11, wherein the area information, comprises one or more identities of one or more wireless access nodes.

14. The apparatus according to claim 11, wherein the area information, comprises one or more identities of one or more groups of wireless access nodes.

15. The apparatus according to claim 11, wherein the area information, comprises timing information.

16. The apparatus according to claim 11, wherein the directing information, comprises; at least one of, a place name or geographical coordinates, related to the geographical area.

17. The apparatus according to claim 11, wherein the directing information, comprises timing information.

18. The apparatus according to claim 11, wherein, initiating network related measurements in the geographical area, further comprises:
requesting an intermediate node to, request a wireless access node to start a network related measurement session and to activate the mobile part of the network related measurement in a mobile communication device in the geographical area.

19. The apparatus according to claim 11, wherein, initiating network related measurements in the geographical area, further comprises:
requesting a wireless access node to start a network related measurement session and to activate the mobile part of the network related measurement in a mobile communication device (MCD) in the geographical area.

20. The apparatus according to claim 11, wherein, initiating network related measurements in the geographical area, comprises at least initiating measurements of one of:
serving cell and neighbor cell reference signal received power, serving cell and neighbor cell reference signal received quality, serving cell and neighbor cell reference signal, signal to interference and noise ratio and radio link quality comprising at least one of radio link failure and RRC reestablishment failure.

21. A non-transitory computer readable storage medium comprising a computer program that, when run by one or more processors, causes a node or server to execute a method performed by an incentive and measurement trigger function (IAMTF), for directing a mobile communications device towards a geographical area with the purpose of utilizing the mobile communication device, when in the geographical area, for making network related measurements, the method comprising:
obtaining area information indicating the geographical area for which it would be beneficial to make network related measurements; and
providing directing information indicating the geographical area to an incentive distribution function (IDF) that distributes, to one or more mobile communications devices not currently served by a cell in the geographical area, an incentive to roam into the geographical area; and
initiating network related measurements in the geographical area,
wherein at least one of the one or more mobile communications devices is a reporting mobile communications device that received the incentive to roam into the geographical area and then reported network related measurements while in idle mode,
and wherein the method further comprises:
verifying an actual presence of the reporting mobile communications device in the geographical area by distributing the incentive to the reporting mobile communications device only after the reporting mobile communications device connects to the cell in the geographical area.

* * * * *